(12) United States Patent
Klausner et al.

(10) Patent No.: US 11,705,255 B2
(45) Date of Patent: Jul. 18, 2023

(54) POROUS STABILIZED BEDS, METHODS OF MANUFACTURE THEREOF AND ARTICLES COMPRISING THE SAME

(71) Applicant: University of Florida Research Foundation, Inc., Gainesville, FL (US)

(72) Inventors: James F. Klausner, Haslett, MI (US); Renwei Mei, Gainesville, FL (US); Ayyoub Mehdizadeh Momen, Knoxville, TN (US); Kyle Allen, San Ramon, CA (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 17/210,742

(22) Filed: Mar. 24, 2021

(65) Prior Publication Data
US 2021/0233688 A1 Jul. 29, 2021

Related U.S. Application Data

(60) Continuation of application No. 15/910,052, filed on Mar. 2, 2018, now Pat. No. 10,991,490, which is a (Continued)

(51) Int. Cl.
*H01F 1/01* (2006.01)
*C01B 32/50* (2017.01)
(Continued)

(52) U.S. Cl.
CPC ............. *H01F 1/01* (2013.01); *B01J 23/745* (2013.01); *B01J 37/0009* (2013.01);
(Continued)

(58) Field of Classification Search
CPC ........................................................ H01F 1/01
See application file for complete search history.

(56) References Cited

U.S. PATENT DOCUMENTS 4,030,890 A 6/1977 Diggs
4,115,927 A 9/1978 Rosensweig
(Continued)

FOREIGN PATENT DOCUMENTS

DE 2735767 A1 3/1979
JP 10279955 A 10/1998
(Continued)

OTHER PUBLICATIONS

DE2735767 Published Mar. 1, 1979; Machine Translation; 19 Pages.
(Continued)

*Primary Examiner* — Christopher S Kessler
(74) *Attorney, Agent, or Firm* — Thomas | Horstemeyer, LLP

(57) ABSTRACT

Disclosed herein is a method comprising disposing a first particle in a reactor; the first particle being a magnetic particle or a particle that can be influenced by a magnetic field, an electric field or a combination of an electrical field and a magnetic field; fluidizing the first particle in the reactor; applying a uniform magnetic field, a uniform electrical field or a combination of a uniform magnetic field and uniform electrical field to the reactor; elevating the temperature of the reactor; and fusing the first particles to form a monolithic solid.

16 Claims, 8 Drawing Sheets

Related U.S. Application Data division of application No. 14/131,357, filed as application No. PCT/US2012/045698 on Jul. 6, 2012, now Pat. No. 9,966,171.

(60) Provisional application No. 61/505,890, filed on Jul. 8, 2011.

(51) Int. Cl.

| | |
|---|---|
| *C04B 38/00* | (2006.01) |
| *H01F 1/34* | (2006.01) |
| *B01J 23/745* | (2006.01) |
| *B01J 37/00* | (2006.01) |
| *B01J 37/02* | (2006.01) |
| *H01F 41/00* | (2006.01) |
| *C04B 35/515* | (2006.01) |

(52) U.S. Cl.
CPC ........... *B01J 37/0221* (2013.01); *C01B 32/50* (2017.08); *C04B 35/515* (2013.01); *C04B 38/0038* (2013.01); *H01F 1/342* (2013.01); *H01F 41/00* (2013.01)

(56) References Cited

U.S. PATENT DOCUMENTS

| | | | |
|---|---|---|---|
| 4,292,171 A | 9/1981 | Mayer et al. | |
| 4,319,893 A | 3/1982 | Hatch et al. | |
| 4,430,254 A | 2/1984 | Passariello | |
| 4,881,985 A * | 11/1989 | Brewer | H01F 1/0576 75/348 |
| 5,143,668 A | 9/1992 | Hida | |
| 5,863,850 A | 1/1999 | Nawa | |
| 6,158,351 A * | 12/2000 | Mravic | F42B 12/745 102/515 |
| 6,633,042 B1 | 10/2003 | Funken et al. | |
| 6,780,457 B2 | 8/2004 | Baumann | |
| 7,033,570 B2 | 4/2006 | Weimer et al. | |
| 7,140,181 B1 | 11/2006 | Jensen et al. | |
| 8,028,626 B2 * | 10/2011 | Hash | F42B 30/02 102/517 |
| 8,110,174 B2 | 2/2012 | Kodama | |
| 8,187,731 B2 | 5/2012 | Weimer | |
| 8,388,706 B2 | 3/2013 | Ugolin | |
| 2003/0208959 A1 | 11/2003 | Weimer et al. | |
| 2005/0175533 A1 | 8/2005 | Thomas et al. | |
| 2006/0229476 A1 | 10/2006 | Mitchell et al. | |
| 2008/0089834 A1 | 4/2008 | Kodama | |
| 2008/0236389 A1 | 10/2008 | Leedy et al. | |
| 2009/0142578 A1 | 6/2009 | Riman et al. | |
| 2009/0232725 A1 | 9/2009 | Aaron | |
| 2010/0140154 A1 | 6/2010 | Colon et al. | |
| 2010/0303692 A1 | 12/2010 | Perkins et al. | |
| 2011/0136027 A1 | 6/2011 | Chen et al. | |
| 2012/0295113 A1 | 11/2012 | Kurizoe | |
| 2012/0302436 A1 | 11/2012 | Vormberg | |
| 2013/0266502 A1 | 10/2013 | Lichty et al. | |
| 2014/0346034 A1 | 11/2014 | Klausner | |
| 2015/0321158 A1 | 11/2015 | Klausner | |

FOREIGN PATENT DOCUMENTS

| | | | | |
|---|---|---|---|---|
| KR | 20110037329 A | 4/2011 | | |
| KR | 20110077154 A | 7/2011 | | |
| WO | 9600125 A1 | 1/1996 | | |
| WO | 03004942 A1 | 1/2003 | | |
| WO | 03076334 A1 | 9/2003 | | |
| WO | 2009138822 A1 | 11/2009 | | |
| WO | WO-2009138822 A1 | 11/2009 | ............. | F25B 21/00 |
| WO | WO2010041014 A1 | 4/2010 | | |

OTHER PUBLICATIONS

Extended European Search Report for EP Application No. 12811990. 6; Report dated Feb. 2, 2015 (6 pages).

International Preliminary Report on Patentability for Application No. PCT/US2012/071332 filed Dec. 21, 2012; dated Jun. 24, 2014; 7 pages.

Diver et al.; "Testing of a CR5 Solar Thermochemical Heat Engine Prototype", Proceedings of the ASME 2010 4th International Conference on Energy Sustainability, May 2010, pp. 1-8.

European Extended Search Report for EP Application No. 13865853. 9; dated Aug. 19, 2016 (5 pages).

Kodama et al.; "A Two-Step Thermochemical Water Splitting by Iron-Oxide on Stabilized Zirconia", Journal of Solar Energy Engineering, vol. 128, No. 1, Jan. 2006, 5 pages.

European Extended Search Report for EP Application No. 12859196. 3; dated Dec. 1, 2015 (6 pages).

Abanades, Stephane et al., "C02 splitting by thermo-chemical looping based on ZrxCe1-x02 oxygen carriers for synthetic fuel generation" Fuel, vol. 102, Dec. 2012, pp. 180-186, Special Section: ACS Clean Coal.

Diver, Richard B. et al., "Solar Thermochemical Water-Splitting Ferrite-Cycle Heat Engines", J. Sol. Energy Eng., Nov. 2008, vol. 130, Issue 4, 041001 (8 pages).

Evans, Lindsey R. et al., "Materials Development for the CR5 Solar Thermochemical Heat Engine", ASME 2006 International Solar Energy Conference (ISEC2006), Jul. 8-13, 2006, Denver, Colorado, USA Sponsor: Solar Energy Division, Solar Energy, Paper No. IS.

Gokon, Nobuyuki et al., "Ferrite/zirconia-coated foam device prepared by spin coating for solar demonstration of thermochemical water-splitting", International Journal of Hydrogen Energy, vol. 36, Issue 3, Feb. 2011, pp. 2014-2028.

Gokon, Nobuyuki et al., "Monoclinic zirconia-supported Fe3O4 for the two-step water-splitting thermochemical cycle at high thermal reduction temperatures of 1400-1600° C.", International Journal of Hydrogen Energy, vol. 34, Issue 3, Feb. 2009, pp. 1208-1217.

Gokon, Nobuyuki et al., "Thermochemical two-step water-splitting for hydrogen production using Fe-YSZ particles and a ceramic foam device", Energy, vol. 33, Issue 9, Sep. 2008, pp. 1407-1416.

Guillot, Stephanie, et al., "Corrosion effects between molten salts and thermal storage material for concentrated solar power plants", Applied Energy, vol. 94, Jun. 2012, pp. 174-181.

Herrmann, Ulf, et al. "Two-tank molten salt storage for parabolic trough solar power plants", Energy, vol. 29, Issues 5-6, Apr.-May 2004, pp. 883-893.

International Preliminary Report on Patentability for International Application No. PCT/US2013/076037 International Filing date Dec. 18, 2013; Report dated Jun. 23, 2015; 6 pages.

International Search Report for International Application No. PCT/US2013/076037 International Filing date Dec. 18, 2013; Report dated Apr. 4, 2014; 5 pages.

Kodama, T. et al. "Thermochemical hydrogen production by a redox system of ZrO2-supported Co(II)-ferrite", Solar Energy, vol. 78, Issue 5, May 2005, Solar Hydrogen pp. 623-631.

Lichty, Paul et al., "Atomic layer deposited thin film metal oxides for fuel production in a solar cavity reactor", International Journal of Hydrogen Energy, vol. 37, Issue 22, Nov. 2012, pp. 16888-16894.

Mehdizadeh, Ayyoub M., "Enhancement of thermochemical hydrogen production using an iron-silica magnetically stabilized porous structure", International Journal of Hydrogen Energy, vol. 37, Issue 11, Jun. 2012, pp. 8954-8963.

Roeb, Martin, et al., "Materials-Related Aspects of Thermochemical Water and Carbon Dioxide Splitting: A Review" Materials 2012, 5(11), 2015-2054; Published: Oct. 24, 2012.

Written Opinion for International Application No. PCT/US2013/076037 International Filing date Dec. 18, 2013 Report dated Apr. 4, 2014; 5 pages.

Yang, Zhen, et al. "Thermal analysis of solar thermal energy storage in a molten-salt thermocline", Solar Energy, vol. 84, Issue 6, Jun. 2010, pp. 974-985.

Zhu, Xing, et al. "Hydrogen and syngas production from two-step steam reforming of methane over CeO2-Fe2O3 oxygen carrier", Journal of Rare Earths, vol. 28, Issue 6, Dec. 2010, pp. 907-913.

(56) References Cited

OTHER PUBLICATIONS

Anton Meier et al., "Solar chemical reactor technology for industrial production of lime", Solar Energy 80 (2006) 1355-1362.
C. Wieckert, "Design Studies for a Solar Reactor Based on a Simple Radiative Heat Exchange Model", Journal of Solar Energy Engineering, Aug. 2005, vol. 127; pp. 425-429.
International Preliminary Report on Patentability for Application No. PCT/US2012/045698 filed Jul. 6, 2012; dated Jan. 23, 2014; 7 pages.
International Search Report for Application No. PCT/US2012/045698 filed Jul. 6, 2012; dated Jan. 21, 2013; 5 pages.
International Search Report for Application No. PCT/US2012/071332 filed Dec. 21, 2012; dated Apr. 29, 2013; 5 pages.
Written Opinion for Application No. PCT/US2012/071332 filed Dec. 21, 2012; dated Apr. 29, 2013; 6 pages.
Written Opinion for Application No. PCT/US2012/045698 filed Jul. 6, 2012; dated Jan. 21, 2013; 5 pages.

\* cited by examiner

POROUS STABILIZED BEDS, METHODS OF MANUFACTURE THEREOF AND ARTICLES COMPRISING THE SAME

CROSS REFERENCE TO RELATED APPLICATIONS

This application is a Continuation Application of Ser. No. 15/910,052 filed on Mar. 2, 2018 (U.S. Pat. No. 10,991,490 issued on Apr. 27, 2021), which is a Divisional application of Ser. No. 14/131,357 filed Jun. 13, 2014 (U.S. Pat. No. 9,966,171 issued on May 18, 2018), which claims the benefit of PCT Application No. PCT/US2012/045698 filed on Jul. 6, 2012 which claims priority to U.S. Application No. 61/505,890, filed on Jul. 8, 2011, which are incorporated herein by reference in their entirety.

STATEMENT REGARDING FEDERALLY SPONSORED RESEARCH OR SUPPORT

This invention was made with Government support under DE-FE0001321 awarded by the U.S. Department of Energy/National Energy Technology Laboratory (NETL). The Government has certain rights in this invention.

BACKGROUND

Fluidized beds comprising magnetic particles are often used to drive high temperature chemical reactions. In order to produce a fluidized bed that contains magnetic particles, the magnetic particles are disposed upon a substrate and then sintered together. During the sintering process however, the particles that form the substrate fuse together to produce a clump of a metal oxide that has a very low surface area and that can no longer be fluidized. The FIG. 1 illustrates the sintering process. In the FIG. 1, it can be seen that powder particles that have magnetic particles disposed thereon are sintered and fuse together to form a clump of a metal oxide that has a very low surface area. This low surface area clump of metal oxide is unsuitable for supporting chemical reactions and cannot be fluidized.

It is therefore desirable to develop methods for manufacturing monolithic beds that have a high porosity and surface area, and that can function in a manner similar to fluidized beds. It is desirable for the monolithic solid bed section to be used for conducting chemical reactions.

SUMMARY

Disclosed herein is a method comprising disposing a first particle in a reactor; the first particle being a magnetic particle or a particle that can be influenced by a magnetic field, an electric field or a combination of an electrical field and a magnetic field; fluidizing the first particle in the reactor; applying a uniform magnetic field, a uniform electrical field or a combination of a uniform magnetic field and a uniform electrical field to the reactor; elevating the temperature of the reactor; and fusing the first particles to form a monolithic solid.

Disclosed herein too is a method comprising disposing a first particle in a reactor, the first particle being a magnetic particle or a particle that can be influenced by a magnetic field, an electric field or a combination of an electrical field and a magnetic field; fluidizing the first particle in the reactor; applying a uniform magnetic field, a uniform electrical field or a combination of a uniform magnetic field and a uniform electrical field to the reactor; disposing a plurality of reactants into the reactor; elevating the temperature of the reactor to react the reactants in the reactor; and fusing the first particles to form a monolithic solid.

Disclosed herein too is an article comprising a monolithic solid comprising a plurality of metal particles fused together in the form of aligned chains; the monolithic solid being porous.

DETAILED DESCRIPTION

Figure 1:
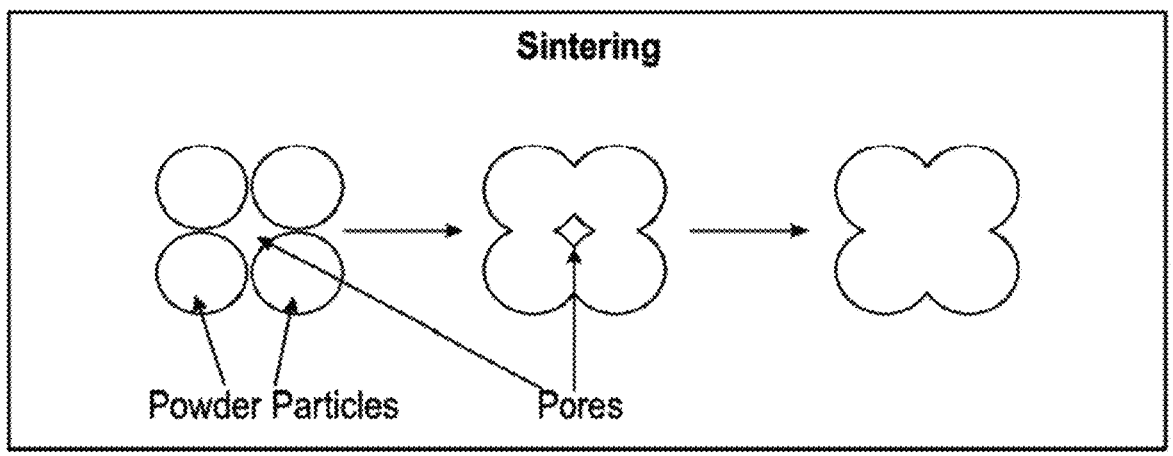
FIG. 1 is a depiction of the fusing of particles that generally occurs in conventional fluid bed reactors.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or, "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower." can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting of" and "consisting essentially of"

The term and/or is used herein to mean both "and" as well as "or". For example, "A and/or B" is construed to mean A, B or A and B.

Various numerical ranges are disclosed herein. These ranges are inclusive of the endpoints as well as numerical values between these endpoints. The numbers in these ranges and those on the endpoints are interchangeable.

Disclosed herein is a monolithic solid that comprises chains of a first particle that is magnetic or that can be influenced by a magnetic field, an electrical field or a combination of magnetic fields and electrical fields. The magnetic fields disclosed herein are in addition to those produced the earth's magnetic field. The electrical fields disclosed herein are independent of those produced by natural light (such as light from the sun) and are in addition to those produced by the natural light or light from other source of illumination (e.g., bulbs, neon lights, fluorescent lights, and the like). It is also to be noted that combinations of electrical and magnetic fields are in addition to electromagnetic fields produced by natural light or light from other source of illumination (e.g., bulbs, neon lights, fluorescent lights, and the like).

Disclosed herein too is a monolithic solid that comprises chains of a first particle that is magnetic or that can be influenced by a magnetic field, an electrical field or a combination of magnetic fields and electrical fields and a second particle that is non-magnetic and that cannot be influenced by a magnetic field and/or an electrical field. The monolithic solid is porous, has a high surface area and can be used in lieu of a fluidized bed or in addition to a fluidized bed to conduct reactions. Disclosed herein too is a method of manufacturing the monolithic solid that comprises chains of the first particle that is magnetic or that can be influenced by a magnetic field, an electrical field or a combination of magnetic fields and electrical fields.

The method comprises fluidizing the first particles and/or the second particles in a fluidized bed reactor in the presence of and under the influence of a magnetic field that is greater than the earth's magnetic field, an electrical field or a combination of a magnetic field and an electrical field. In one embodiment, the first particles are fluidized by simultaneously flowing a fluid through the fluidized bed reactor, in another embodiment, the first particles are fluidized in a static flow field, i.e., a field where the fluid does not flow substantially, but has a density effective to suspend the first particles. The first particles under the influence of the fluid and the magnetic field align along the magnetic field lines and/or the electrical field lines and produce a coherent structure that comprises chains of the first particles. Since the aligned particle chains also repel each other due to induced magnetization or due to induced electrical polarity, they create a structure that has a natural spacing among the chains to produce a powdered structure that is porous. If the fluid flow and the magnetic/electrical field are suspended at this point, the particles would crumble to a pile of particles. However, at this stage, under the sustained influence of the fluid flow and the magnetic field, the temperature of the fluidized bed reactor is elevated to sinter the first particles together to form the monolithic solid.

The monolithic solid thus formed has a high surface area and can be used to conduct chemical reactions at elevated temperatures. In an exemplary embodiment, the monolithic solid can be used in a hydrogen production looping process. The hydrogen production rate from this monolithic structure is improved significantly especially when compared with a standard fluidized bed, where the particles are free flowing.

The monolithic structure can be further subjected to an elevated temperature in the presence of a reactive gas (e.g., a carbonaceous gas) to grow carbon nanotubes in the interstices of the monolithic solid. Alternatively, other nanorods, nanowires or nanoparticles can also be grown in the interstices of the monolithic solid to increase the surface area. The presence of the nanorods, nanowires, nanoparticles or carbon nanotubes further increases the surface area of the monolithic solid thereby increasing the productivity rate when reactions are conducted on the monolithic solid.

In another embodiment by using a distribution of first particle sizes or First particle compositions, a monolithic solid can be produced that has a gradient in the composition with the heaviest first particles located at one end of the monolithic structure and the lightest particles located at an opposing end of the monolithic structure. The monolithic solid can be manufactured to comprise gradients in particle size, composition and/or density.

In an alternative embodiment, by using an electrical field instead of a magnetic field, particles that are oriented by the presence of the electrical field may be aligned in the presence of a fluid flow field and then fused together to form the monolithic solid. Examples of such electrical particles can be found in the section on electrorheological fluids below.

In one embodiment, the method comprises fluidizing a plurality of first particles that are magnetic or that can be magnetized and a plurality of second particles that are non-magnetic and that cannot be magnetized. The method comprises fluidizing the plurality of first and second particles in a fluidized bed reactor in the presence of and under the influence of a magnetic field that is greater than the earth's magnetic field. Alternatively, the method comprises fluidizing the plurality of first and second particles in a fluidized bed reactor in the presence of and under the influence of an electrical field that is greater than any naturally occurring electrical fields on the earth's surface. Combinations of electrical and magnetic fields can be used.

The plurality of first and the second particles under the influence of the fluid flow and the magnetic/electrical field align along the magnetic/electrical field lines and produce a coherent structure that comprises aligned chains of the first particles. Since the aligned chains also repel each other due to induced magnetization and/or due to induced electrical polarity, they create a structure that has a natural spacing among the chains. Following the formation of the coherent structure, the temperature of the reactor is elevated to sinter the first and/or second particles together to form a monolithic solid.

In one embodiment, the first particles are fused to each other and support the second particles in the monolithic solid. In an alternative embodiment, the coherent structure can be used to conduct a chemical reaction, in which case the first particles are fused together to form the monolithic structure. The monolithic structure thus formed can also be used to conduct chemical reactions at elevated temperatures. In this embodiment, carbon nanotubes, nanorods, nanowires or nanoparticles can also be grown in the interstices of the monolithic solid. The monolithic solid of this embodiment can also comprise gradients in first and second particle composition, size, and/or density.

While this disclosure has described first and second particles, there can be a plurality of different first particles (i.e., first particles having different chemical compositions) or a plurality of different second particles. For example, the first particles which are susceptible to a magnetic field can comprise one group of iron particles, another group of nickel particles, and so on. Similarly, for example, the second particles which are non-magnetic particles can comprise one group of silica particles, a second group of polymer particles, and so on.

As noted above, the first particles are either magnetic particles or particles that can be influenced by a magnetic field. Magnetic particles are those that respond at an atomic or subatomic level to an applied magnetic field. For example, one form of magnetic particles can be ferromagnetic particles that produce their own persistent magnetic field. Magnetic particles are those that are attracted to a magnetic Feld (via paramagnetism) others are repulsed by a magnetic field (via diamagnetism) others have a much more complex relationship with an applied magnetic field. Non-magnetic particles are those that are negligibly affected by magnetic fields. The magnetic state (or phase) of a material depends on temperature (and other variables such as pressure and applied magnetic field) so that a material may exhibit more than one form of magnetism depending on its temperature.

Magnetic particles include iron, nickel, cobalt, ferrites, rare earth magnets or alloys thereof. Examples of alloy magnets are Alnico (a magnet alloy that comprises aluminum, iron, cobalt and nickel), samarium cobalt (SmCo) and neodymium iron boron (NdFeB), $FeOFe_2O_3$, $NiOFe_2O_3$, $CuOFe_2O_3$, $MgOFe_2O_3$, MnBi, MnSb, $MnOFe_2O$, or the like, or a combination comprising at least one of the foregoing magnetic particles. Alloys that include a combination of magnetic particles and non-magnetic particles may also be used. The non-magnetic portion present in the alloys may be metals, ceramics, or polymers. Exemplary magnetic particles are iron particles.

The first particles can be present in the form of rods, tubes, whiskers, fibers, platelets, spheres, cubes, or the like, or other geometrical forms. Aggregates and agglomerates of the first particles are also included. They can have average dimensions in the nanometer range or in the micrometer range. The nanometer range generally includes particle sizes of less than or equal to about 100 nanometers, while the micrometer range generally includes particle sizes of 100 nanometers or greater.

The first particles generally have an average particle size of about 40 to about 100 micrometers, preferably about 75 to about 90 micrometers. The average particle size is measured in terms of a diameter of gyration.

The first particles are present in an amount of about 5 to about 100 wt %, specifically about 10 to about 90 wt %, and more specifically about 20 to about 50 wt %, of the total number of first particles and second particles introduced into the fluidized bed reactor.

The second particles that are non-magnetic and that cannot be magnetized can include inorganic oxides, carbides, oxycarbides, nitrides, oxynitrides, borides, activatable carbon, or the like, or a combination comprising at least one of the foregoing. It is desirable for the second particles to be electrically insulating. Electrically insulating particles generally have a bulk volume resistivity that is greater than about $1 \times 10^{11}$ ohm-cm. Exemplary second particles are silicon dioxide particles.

The second particles generally have an average particle size of about 20 to about 100 micrometers, preferably about 50 to about 75 micrometers. The average particle size is measured in terms of a diameter of gyration.

The second particles are present in an amount of about 0 to about 95 wt %, specifically about 90 to about 10 wt %, and more specifically about 80 to about 50 wt %, of the total number of first particles and second particles introduced into the fluidized bed reactor.

The first particles can also be influenced by an electrical field. These first particles are electrically active. They can be ferroelectric or, made from an electrically conducting material coated with an insulator, or electro-osmotically active particles, in the case of ferroelectric or conducting material, the particles would have a high dielectric constant. Examples of such materials are metal nanorods (e.g., aluminum) or nanotubes coated with a polymer, urea coated nanoparticles of barium titanium oxalate, carbon nanotubes, or the like, or a combination comprising at least one of the foregoing particles.

The fluid flow rate in the fluidized bed reactor during the period of application of the magnetic field, the electrical field or a combination of an electrical field and magnetic field can be from about 0.01 to about 5 standard liters per minute.

The magnetic field is uniformly applied across the fluidized bed reactor and has a strength of about 20 to about 30) gauss.

The sintering temperature depends upon the composition of the first particles. The sintering temperature may be about 300 to about 2,000° C., specifically about 4) to about 1,500° C. and more specifically about 500 to about 1,300° C.

In one embodiment, the first particles can be present in a magnetorheological fluid or an electrorheological fluid. The term magnetorheological fluid encompasses magnetorheological fluids, ferrofluids, colloidal magnetic fluids, and the like. Magnetorheological (MR) fluids and elastomers are known as "smart" materials whose rheological properties can rapidly change upon application of a magnetic field. Similarly, electrorheological fluids (ER) are "smart" materials whose rheological properties can rapidly change upon application of an electrical field.

MR fluids are suspensions of micrometer-sized and/or nanometer-sized, magnetically polarizable particles in oil or other liquids. When a MR fluid is exposed to a magnetic field, the normally randomly oriented particles form chains of particles in the direction of the magnetic field lines. The particle chains increase the apparent viscosity (flow resistance) of the fluid as the particles freeze into place under the influence of the magnetic field. The stiffness of the structure is accomplished by changing the shear and compression/tension moduli of the MR fluid by varying the strength of the applied magnetic field. The MR fluids typically develop structure when exposed to a magnetic field in as little as a few milliseconds. Discontinuing the exposure of the MR fluid to the magnetic field reverses the process and the fluid returns to a lower viscosity state. In this particular instance, after alignment of the magnetic particles, the temperature of the reactor is increased to a point where the magnetic particles are able to fuse with one another. When a magnetorheological fluid is used, it may not be desirable to fluidize the particles with a moving fluid, since the particles are already suspended a fluid.

Suitable magnetorheological fluids include ferromagnetic or paramagnetic first particles dispersed in a carrier fluid. Suitable first particles that can be disposed in magnetorheological fluids include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; or the like, or a combination comprising at least one of the foregoing particles. Examples of suitable iron particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

Suitable carrier fluids for the MR fluid composition include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated, and combinations comprising at least one of the foregoing fluids.

The viscosity of the carrier fluid for the MR fluid composition can be less than or equal to about 100,000 centipoise, specifically less than or equal to about 10,000 centipoise, and more specifically less than or equal to about 1,000 centipoise at room temperature. It is also desirable for the viscosity of the carrier fluid to be greater than or equal to about 1 centipoise, specifically greater than or equal to about 250 centipoise, and more specifically greater than or equal to about 500 centipoise at room temperature.

Aqueous carrier fluids may also be used, especially those comprising hydrophilic mineral clays such as bentonite and hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and specifically less than or equal to about 3.0% Also, the amount of polar organic solvents is specifically greater than or equal to about 0.1%, and more specifically greater than or equal to about 1.0% by volume of the total MR fluid. The pH of the aqueous carrier fluid is specifically less than or equal to about 13, and specifically less or equal to about 9.0. Also, the pH of the aqueous carrier fluid is greater than or equal to about 5.0, and specifically greater than or equal to about 8.0.

Natural or synthetic bentonite or hectorite may be used. The amount of bentonite or hectorite in the MR fluid is less than or equal to about 10 percent by weight of the total MR fluid, specifically less than or equal to about 8.0 percent by weight, and more specifically less than or equal to about 6.0 percent by weight. Preferably, the bentonite or hectorite is present in greater than or equal to about 0.1 percent by weight, specifically greater than or equal to about 1.0 percent by weight, and more specifically greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Electrorheological fluids are most commonly colloidal suspensions of fine particles in non-conducting fluids. Under an applied electric field, electrorheological fluids form fibrous structures that are parallel to the applied field and can increase in viscosity by a factor of up to $10^5$. The change in viscosity is generally proportional to the applied potential. ER fluids are made by suspending particles in a liquid whose dielectric constant or conductivity is mismatched in order to create dipole particle interactions in the presence of an alternating current (ac) or direct current (dc) electric field.

Upon creating a structured solid in the reactor (upon application of the electric field) the temperature within the reactor is increased to form the monolithic solid that has a high surface area.

Figure 2:
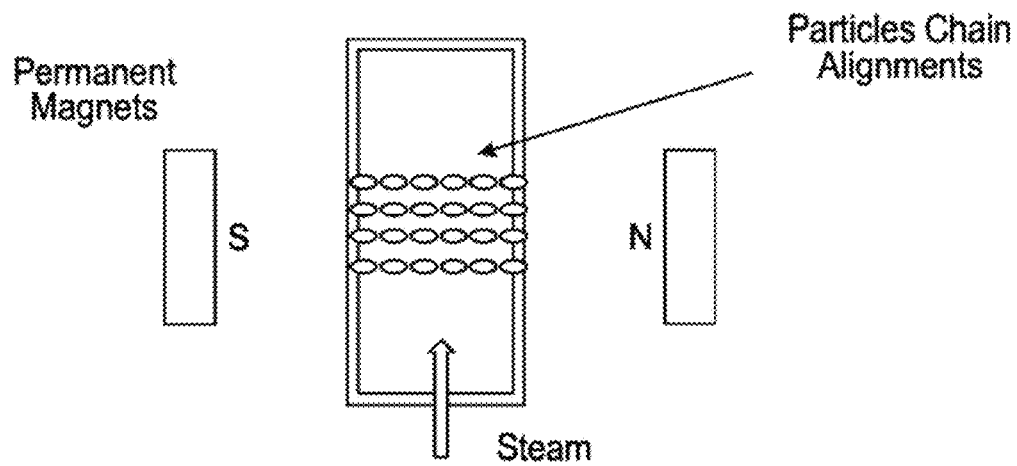
FIG. 2 is a depiction of an exemplary set up for producing the monolithic solid.

In one exemplary embodiment, in one manner of proceeding, first particles comprising iron are fluidized in a fluidized bed reactor using steam as the fluid. This is depicted in the FIG. 2. A magnetic field is applied to the fluidized bed reactor and freezes the iron particles into place. The temperature of the fluidized bed reactor is then elevated to a temperature of about 600° C. to promote sintering of the iron particles. By stabilizing and fluidizing the bed of iron particles using a uniform magnetic field, and sintering the particles to form the monolithic solid, it forms a high porosity, high surface area monolithic solid that is very favorable for conducting high reactivity chemical reactions.

In another embodiment, the first particles (that comprise a magnetic material) can be disposed on the second particles (that do not contain the magnetic material) to form a composite particle. The composite particles are placed in the fluidized bed reactor and are fluidized in a flow field. A uniform magnetic field is then applied to the fluidized bed reactor and the bed of particles is then sintered to form the monolithic solid. The first particles may be disposed on the second particles using techniques such as chemical vapor deposition or solution deposition.

Chemical vapor deposition includes atmospheric chemical vapor deposition, low pressure chemical vapor deposition, ultrahigh vacuum chemical vapor deposition, aerosol assisted vapor deposition, direct liquid injection chemical vapor deposition, microwave plasma assisted chemical vapor deposition, remove plasma enhanced chemical vapor deposition, atomic layer chemical vapor deposition, hot wire (hot filament) chemical vapor deposition, metal organic chemical vapor deposition, combustion chemical vapor deposition, vapor phase epitaxy, rapid thermal chemical vapor deposition, hybrid physical chemical vapor deposition, or a combination comprising at least one of the foregoing processes. If combinations of the foregoing chemical vapor deposition processes are used, they may be employed simultaneously or sequentially.

In solution deposition, a metal salt (e.g., $FeCl_3$) is dissolved in water to form a salt solution. The second particles (e.g., silica) are then put into the salt solution. The water is then evaporated leaving metal salt particles disposed on the second particles. The metal salt particles are then reduced in a hydrogen atmosphere at an elevated temperature to form metal containing first particles that are disposed on second particles. These composite particles are then fluidized in the presence of a magnetic field and then sintered to from the monolithic solid.

As noted above, the monolithic solid has a high surface area that can be used to support reactions. In one embodiment, the monolithic solid has a surface area of about 0.1 square meters per gram to about 2000 square meters per gram.

The monolithic solid can be used to conduct reactions. It can also be used as a porous filter, a support system for thermal insulation, a support system for dyes in a solar panel or a solar cell, and the like. The monolithic solid can also be used to manufacture electrically conductive panels for use in electronics, automotive body panels, acoustic panels, and the like.

The following examples, which are meant to be exemplary, not limiting, illustrate compositions and methods of manufacturing of some of the various embodiments described herein.

Example 1

This example was conducted to demonstrate the manufacturing of the monolithic solid. It was also conducted to demonstrate the use of the monolithic solid to conduct reactions. The magnetically stabilized bed (which eventually formed the monolithic solid) used for the current example is located in the middle section of a fused quartz glass tube with inner diameter and length of 45.4 millimeter (mm) and 600 mm, respectively. The quartz tube is capable of operating at temperatures up to 1200° C. A pre-factory installed porous quartz frit, with pore sizes ranging from 20 to 90 micrometers, is placed in the middle of the quartz tube to serve as the low distributor. The pressure drop across the frit is completely linear in the range of the operating gas flow ($\Delta P_{frit}$ [pa]=4800 U [m·s$^{-1}$]).

Figure 3A:
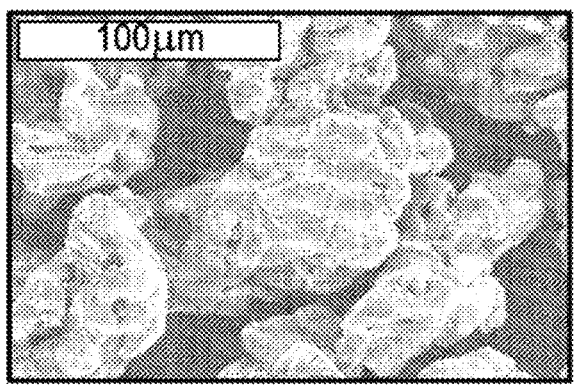
FIG. 3A is a scanning electron microscope image of several iron powder particles prior to the start of the reaction.
Figure 3B:
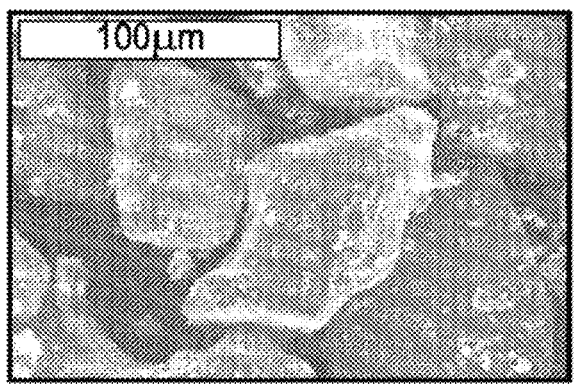
FIG. 3B is a scanning electron microscope image of silica particles prior to the start of the reaction.

Commercially available iron powder (commercially available from Hoeganaes Corporation as ANCOR® MH-100) is used for the bed. Iron powder was carefully sieved to obtain particles in the narrow size range of 63 to 75 μm. Therefore, the reactor utilizes mono-disperse iron powder with a mean particle diameter of approximately 69 μm. An SEM image of several iron powder particles prior to the start of the reaction is illustrated in FIG. 3A. For a conventional fluidized or packed bed reactor, the hydrogen production rate reaches a peak during the first oxidation cycle; however, over successive cycles, particles will sinter and micro-scale pores within individual particles and spacing between neighboring particles will begin to close. This blocks most of the flow paths and prevents steam to uniformly flow through the bed.

Both factors dramatically reduce the hydrogen production rate. Sintering continuously degrades the chemically active surface area, and the hydrogen production rate is likewise degraded. After several redox cycles the iron bed is rendered useless. In contrast, the magnetically stabilized porous structure (discussed in detail below) experiences pore closure within individual particles during the first oxidation cycle, and yet the majority of meso-scale spacing between neighboring chains is preserved so that the reactive surface area remains largely intact after repeated oxidation and reduction cycles.

Commercially pure silica particles are used as the secondary non-magnetic particles (Sigma-Aldrich, white quartz, mean particle diameter of 90 μm). An SEM image of mono-disperse silica particles is illustrated in FIG. 1B, and the physical properties of the iron and silica powders used in this study are listed in Table 1.

TABLE 1

| | Mean Diameter (μm) | Material Density (g/cm$^3$) | Powder Apparent Density (g/cm$^3$) |
|---|---|---|---|
| Iron | 69 (63 to 75 μm) | 7.87 | 2.55 to 2.86 |
| Silica | 90 (75 to 106 μm) | 2.65 | 1.47 to 1.62 |

Figure 4:
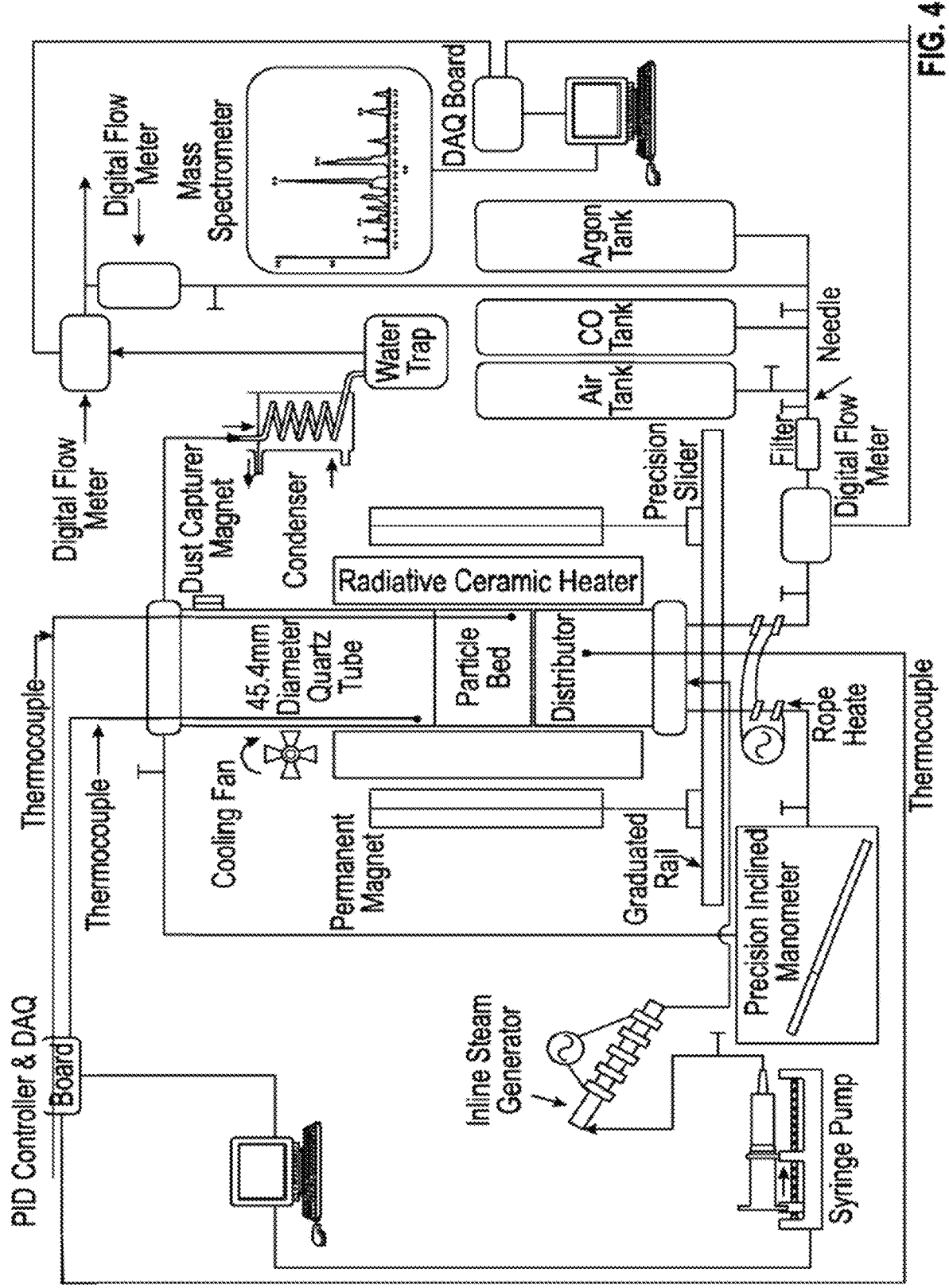
FIG. 4 is a depiction of the set-up used in the Example 1.

The set-up used in this example is depicted in the FIG. 4. A magnetic field is applied to the reactor using two identical large permanent magnets (15×10.5×2.5 cm) with the maximum pull of 128 N. and the field strength at the surface of each magnet is 685 Gauss. A precision Gauss meter (Model GM-2, AlphaLab, Inc.) is used for magnetic field measurements and has a resolution of 0.1 Gauss. An exponential decay of the magnetic field along the axis of each magnet at a distance of $x_1$ can be well described by B=0.0685 exp(−21.12$x_1$) where B & $x_1$ r have units of Tesla and meters respectively. Permanent magnets are installed at two sides of the reactor. The dimensions of the magnets are much larger than the height or diameter of the bed so that the fringing effects of the magnetic field are negligible. These magnets produce a relatively uniform magnetic field across the bed, where the magnetic field at the edge of the bed is less than 6% larger than that on the axis of the bed. The magnetic flux density is controlled by sliding the magnets symmetrically toward the bed using two precision sliders and a graduated rail, all accurately leveled. A very small magnet is installed at the top of the tube in order to capture ultra-fine iron particles which are carried out by the gas stream at a high superficial velocity.

A precision inclined manometer with resolution of 0.05 centimeters (cm) of water (Dwyer instruments) is used to measure the pressure drop across the bed. Two micro needle valves are used for controlling the gas flow rate. Since small disturbances in now rate can change the structure of the bed, especially close to the minimum fluidization velocity, extreme care is given to preventing unnecessary disturbances during the adjustment of the flow rate. Three precision digital mass flow meters (Alicat Scientific, M-20SLPM-D/10M), with resolution of 0.01 standard liters per minutes (SLPM), are used to accurately measure the argon and carbon monoxide flow rates entering the reactor and hydrogen flow rate at the discharge. At the system exit a heated capillary tube transports the discharge gases to a mass spectrometer for real time concentration analysis. An electron-ionization quadrupole mass spectrometer (Hiden model HPR-20) is used for ion monitoring. Prior to the experiment, the mass spectrometer is calibrated for different flow rates of pure gases, while 0.15 standard liters per minute (slm) of argon is constantly introduced to the flow upstream of the mass spectrometer probe.

Therefore, during the example, flow rates of all gases are measured with both a digital mass flow meter and a mass spectrometer. Crosschecking between these two measurements shows that both readings are consistent with less than a 3% difference. An in-line steam generator delivers a steady flow of steam to the reactor. The in-line steam generator consists of an inclined 12.7 millimeter (mm) inner diameter stainless steel pipe which is filled with 6 mm diameter stainless steel spheres. The stainless steel spheres within the steam generator prevent liquid slug formation and enhance the heat transfer contact area. A rope heater in conjunction with a PID controller maintains the outer pipe temperature at 200° C.

A large syringe pump (Syringepump.com, NE-500L) is used to precisely inject water into the top of the inclined steam generator. Injection of water at the top uses gravity to prevent water from being trapped at the bottom of the steam generator. The top and bottom portion of the quartz glass tube are covered with high temperature ceramic insulation for thermal stability. All the gas lines and connections have small heaters to keep the gas temperatures above 150° C. before entering the reactor. This eliminates any water condensation in any part of the system. A small automated cooling fan is also installed close to the reactor. It blows cold ambient air toward the reactor when it is used to quickly reject heat from the reactor to stabilize the temperature.

The procedure for creating the novel magnetically stabilized sintered bed structure starts with mixing mono-disperse silica and iron particles in an apparent volume ratio of 2 to 1 respectively. This is done by manually mixing 100 grams of iron powder with 105 grams of silica powder in a container (powder properties are listed in Table 1 above). The addition of secondary non-magnetic particles (such as silica) to the original iron particle batch provides several benefits: 1) the probability of contact between neighboring iron chains is diminished, 2) the formed structure is strengthened after stabilization and sintering, and 3) the porosity of the formed structure increases.

Next the powder mixture is placed into the reactor from the top while the magnets are kept far away from the chamber. The minimum fluidization velocity for this iron/silica mixture is about 1.25 centimeters per second (cm/sec) without any external magnetic field and increases to 1.4 cm/sec for magnetic field strength of 75 gauss. By introducing inert gas at a superficial velocity much higher than the minimum fluidization velocity (4 to 7.5 cm/sec), the whole bed (iron/silica mixture) is fluidized and very well mixed. Such a high flow rate is necessary to insure there are no dead-zones within the reactor and that the iron and silica particles are well-mixed.

With the radiative ceramic heater removed and the bed in a fluidized state, both magnets are quickly brought close to the chamber to stabilize the bed. The resultant magnetic field at the center of the chamber is about 70 Gauss. The magnetic field creates attractive forces among iron particles along the magnetic field lines and repulsive forces in a direction normal to the field lines. The external magnetic field creates chains with the same magnetic polarity, distributed throughout the bed that repel each other in the lateral direction. The repulsive forces provide a natural spacing among chains. Interstitial silica particles help to maintain separation between the iron particle chains. Under certain circumstances, small channels form in the bed structure and are visible through the chamber wall. When channeling occurs, the magnets should be moved away from the bed and then brought back close to re-stabilize the bed so that no channeling is visible. Channels must be avoided because they lead to non-uniform flow through the reactor, which is detrimental to chemical kinetics.

The gas flow to the magnetically stabilized bed is stopped and the pre-expanded bed structure maintains its form due to the strength of the magnetic field. After the radiative ceramic heater is placed around the bed, the bed is pre-heated to 600° C. while inert argon gas passes through. This temperature is lower than the Curie temperature of iron (770° C.). When the temperature stabilizes, superheated steam is introduced to the bed and the oxidation reaction proceeds. Since iron particle chains in the bed are already aligned along the direction of the external magnetic field, the particles in each chain sinter to the neighboring particles and create a robust porous matrix of iron and silica. The formed structure is stable at high temperatures and ready for cycling at temperatures as high as 800° C. even without the presence of the external magnetic field.

The magnetically stabilized porous structure results in a very high porosity, and a very large chemically active surface area since the bed expansion is done using a fluidization process. The height of the formed structure is about 8.9 cm which does not change during the progressive cycles; therefore the overall porosity and apparent density of the structure do not change. The apparent density of the formed structure is about 1.42 g/cm which is equivalent to a porosity value of 72%. On the other hand, pressure drop measurements across the bed show that the permeability of the fresh mixture of iron/silica is about $1.17 \times 10^{-10}$ (m$^2$), and during the first oxidation step in which the magnetically stabilized bed is formed, the permeability drops to $8.14 \times 10^{-11}$ (m$^2$) and remains intact during successive cycles. The reason for the change in permeability of the bed is due to the microscopic geometrical changes from particles to the sintered chains in the process of creating the magnetically stabilized bed.

Figure 5A:
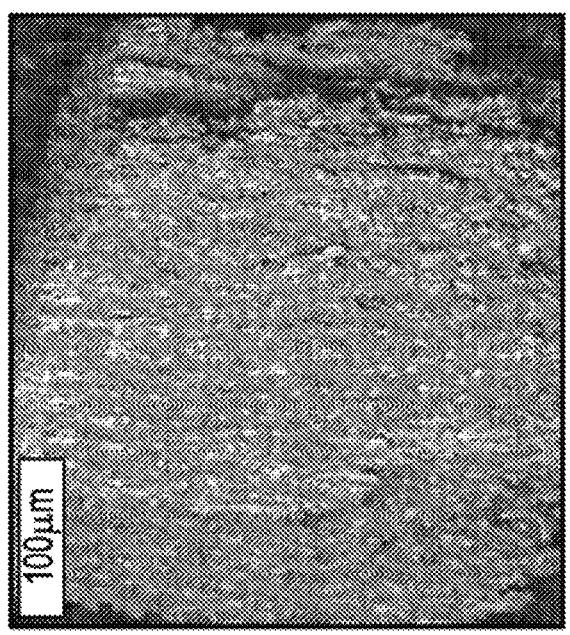
FIG. 5A displays a scanning electron microscope image of a small sample of the magnetically stabilized porous structure using the iron and silica particles listed in Table 1 at a first magnification.
Figure 5B:
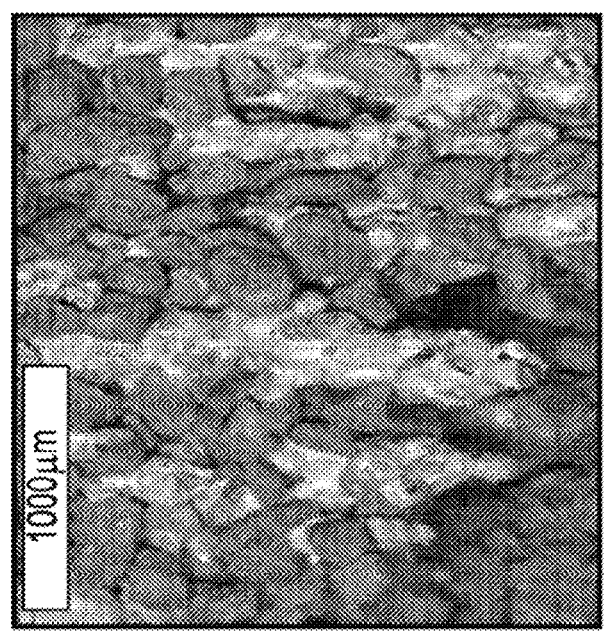
FIG. 5B displays a scanning electron microscope image of a small sample of the magnetically stabilized porous structure using the iron and silica particles listed in Table 1 at a second magnification that is lower than the first magnification of the FIG. 5A.

FIGS. 5A and 5B display SEM images of a small sample of the magnetically stabilized porous structure using the iron and silica particles listed in Table 1 at two different magnifications. FIG. 5A displays a scanning electron microscope image of a small sample of the magnetically stabilized porous structure using the iron and silica particles listed in Table 1 at a first magnification. FIG. 5B displays a scanning electron microscope image of a small sample of the magnetically stabilized porous structure using the iron and silica particles listed in Table 1 at a second magnification that is lower than the first magnification of the FIG. 5A. FIG. 5A is at a larger magnification than FIG. 5B. The sample has undergone 11 oxidation and reduction cycles at 750° C. The sintered iron particle chains clearly align along the magnetic field lines. The diameter of each sintered chain is approximately one iron particle diameter. The fact that the iron chains have the same induced magnetic polarity and repel each other, prevents sintering and agglomeration of the chains in the lateral direction; it is this feature of the magnetically stabilized bed that preserves the high reactive surface area. FIG. 5B also shows that the silica particles fill the spaces between the iron particle chains and the whole structure maintains porosity. The sintered porous structure is strong enough to resist the hydrodynamic shearing at high flow rates, but at the same time the high volumetric fraction of silica particles in the structure makes it rather brittle and can be easily broken up by moderate mechanical forces. The compressive yield strength of the porous structure is measured to be approximately 10 kilopascals (kPa). The structure is useful for practical applications where there might be a periodic need for the replacement of reactive bed.

In order to achieve repeatable and very well controlled oxidation and reduction cycles, the bed temperature and steam delivery are controlled. Since the oxidation step is highly exothermic, a significant quantity of heat is rapidly released during the oxidation step. A sudden increase in the bed temperature, which can exceed 100° C., is possible unless active cooling is applied. The sudden temperature rise is more noticeable as the diameter and mass of the bed increases. To overcome this problem, a proportional integral derivative (PID) controller is used to adjust the duty cycle input to the radiative heater surrounding the quartz reactor tube, and a small cooling fan is installed above the radiative heater, which blows cold ambient air toward the outside layer of insulation around the reactor. The fan is connected to the alarm output of the PID controller. The alarm output of the PID controller triggers when the bed temperature rises about 3° C. above the temperature set-point. Using the fan for rapid cooling minimizes bed temperature fluctuations to within as little as +6 & −3° C. during the experiments. An inclined in-line steam generator delivers steady steam to the reactor. The steam flow rate of the in-line steam generator is solely controlled by the water injection rate and is independent to the system pressure drop characteristics. In all the experiments described in this study water is injected into the in-line steam generator with the rate of 3 grams/minute (g/min).

The total inner volume of the reactor system, including flow lines, is calculated to be 2.1 liters. Thus, during both the oxidation and reduction steps, a small portion of production gases are trapped in the system and will not be registered at the discharge by either the mass flow meter or mass spectrometer. By considering the operation temperatures of different sections of the system, approximately 1.5 standard liters of gases will always remain in the system after stopping the experiment. There is no simple way to correct the collected rate data for these trapped gases in the system. When quantifying the total yield, the maximum error due to trapped gasses is less than 6.0%.

Figure 6:
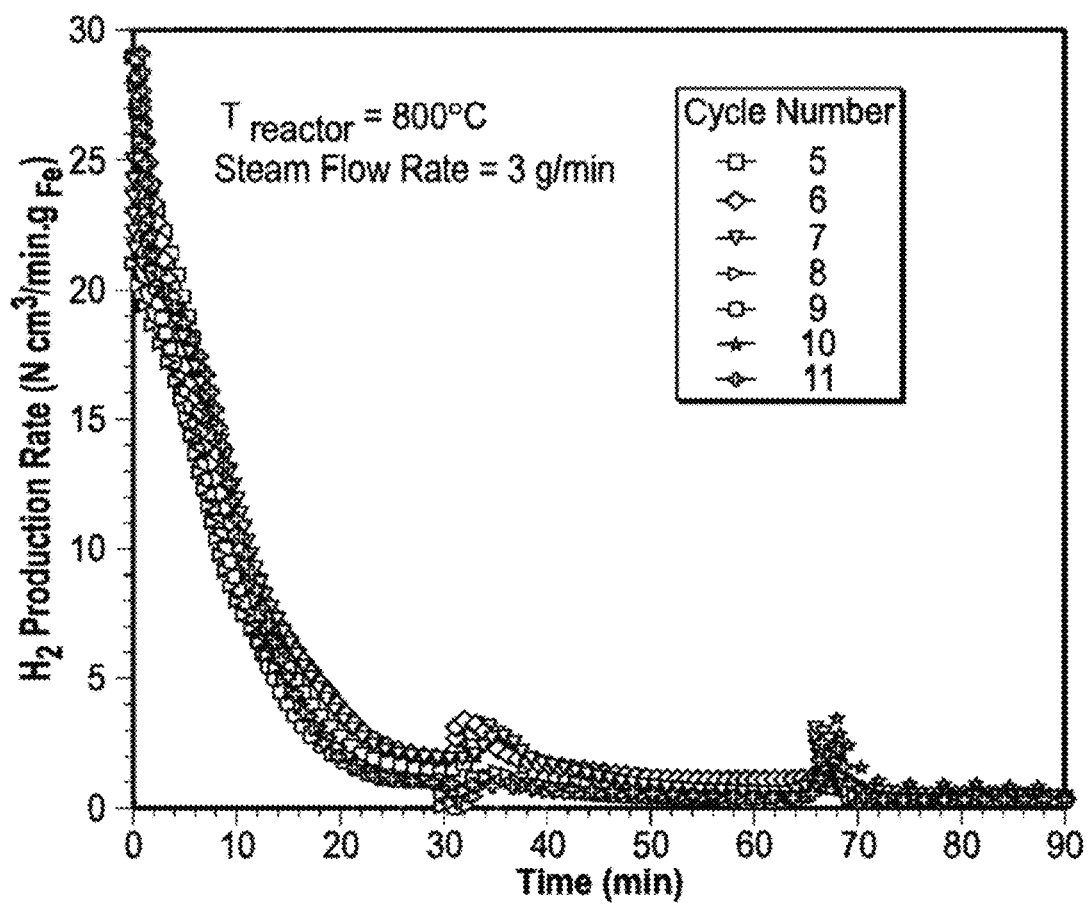
FIG. 6 is a graph showing hydrogen production rate data for 100 grams of iron (mixed with 105 grams of silica) during seven consecutive oxidation/reduction cycles.

Ater condensing the steam and trapping water from the product gases, the hydrogen production rates can be measured using both a mass flow meter and mass spectrometer. The hydrogen production rates for seven, out of eleven total, consecutive cycles of the magnetically stabilized bed structure are measured and shown in the graph in the FIG. 6. Both oxidation and reduction steps are done at 800° C. This temperature is high enough to prevent coking in the bed during the reduction step. The reduction time for all the experiments is 5 hours. Two or three oxidation and reduction cycles are initially needed to find the appropriate steam flow rate needed for the reaction. Considering the need to enhance reaction kinetics and reduce energy losses, both over- and under-flowing steam are detrimental. Accordingly, during the oxidation step 3 g/min of water is injected into the in-line steam generator for 90 minutes. Two disturbances in the rate data associated with the syringe replacement can be seen in the FIG. 6. These disturbances occur at 33 and 66 minutes when the syringe runs low at water and needs to be replaced. The procedure for syringe replacement takes less than 15 seconds. These disturbances do not have a significant effect on the quality of measurements since most of the hydrogen production occurs prior to these disturbances. After 90 minutes, the hydrogen production rate diminishes to a negligible amount. FIG. 6 shows that the rate of hydrogen production is very consistent over repeated cycles. The hydrogen production rate data shown in the FIG. 6 demonstrates that the magnetically stabilized porous structure goes through eleven oxidation and reduction cycles without a noticeable degradation in hydrogen production performance.

Figure 7A:
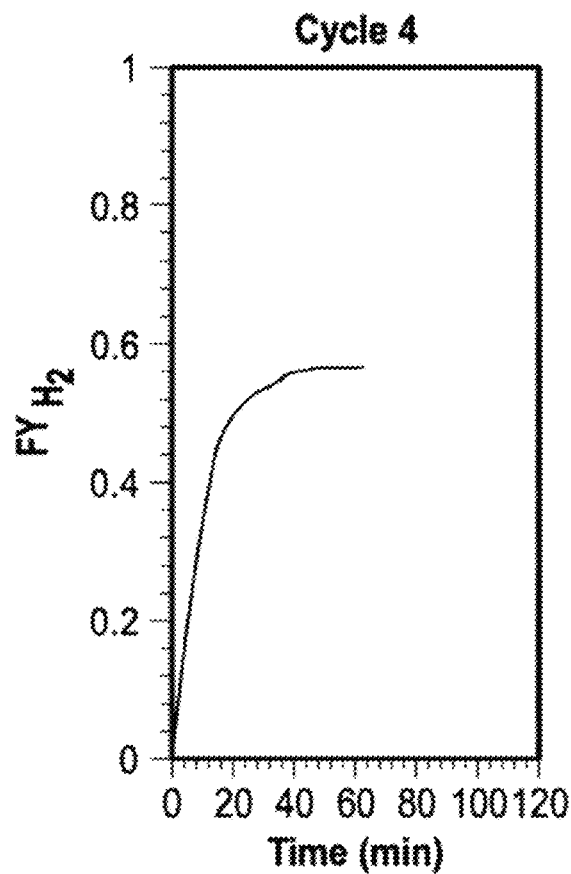
FIG. 7A shows the hydrogen fractional yield for four consecutive oxidation/reduction cycles at 800° C.
Figure 7A:
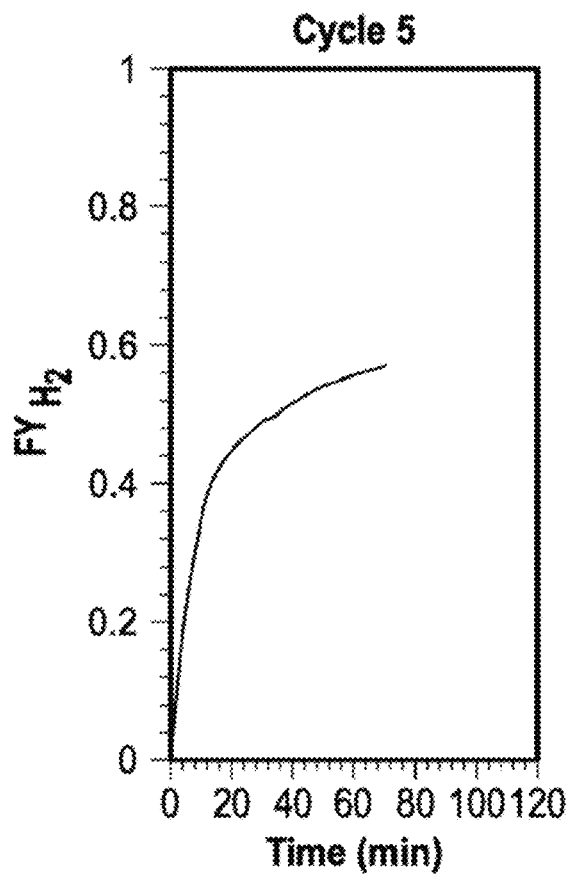
Figure 7A:
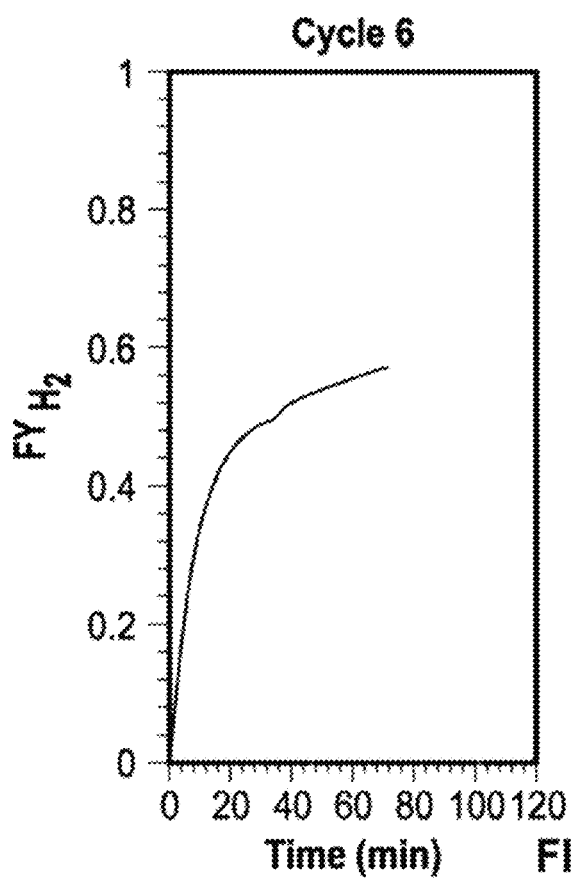
Figure 7A:
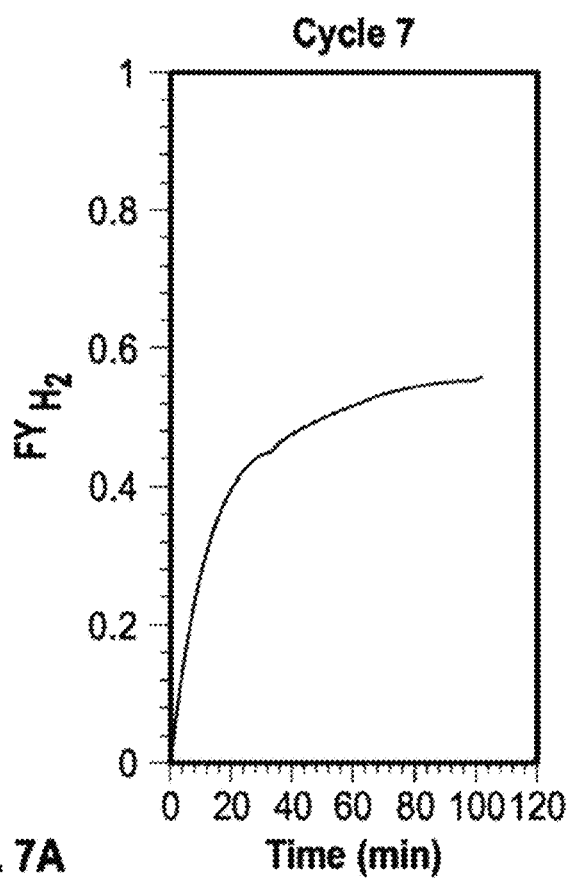
Figure 7B:
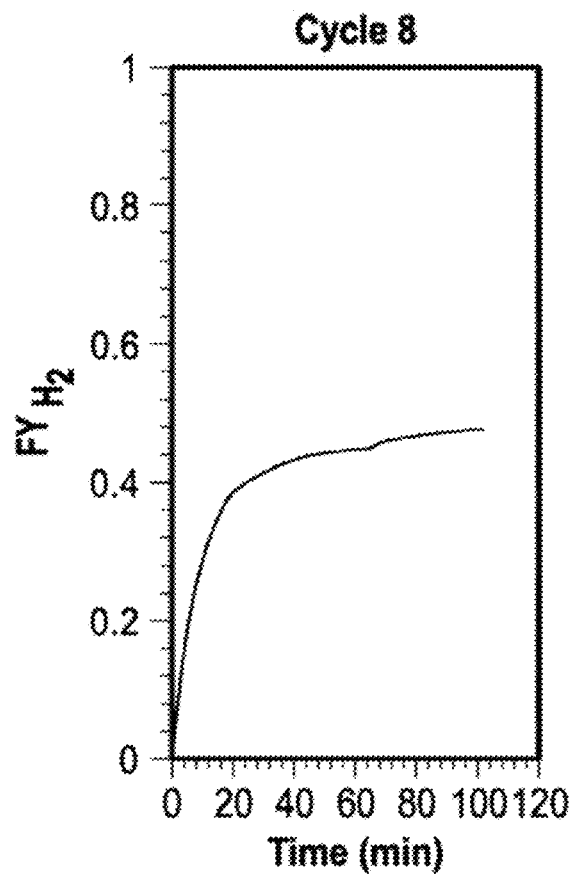
FIG. 7B shows the hydrogen fractional yield for the next four consecutive oxidation/reduction cycles at 800° C.
Figure 7B:
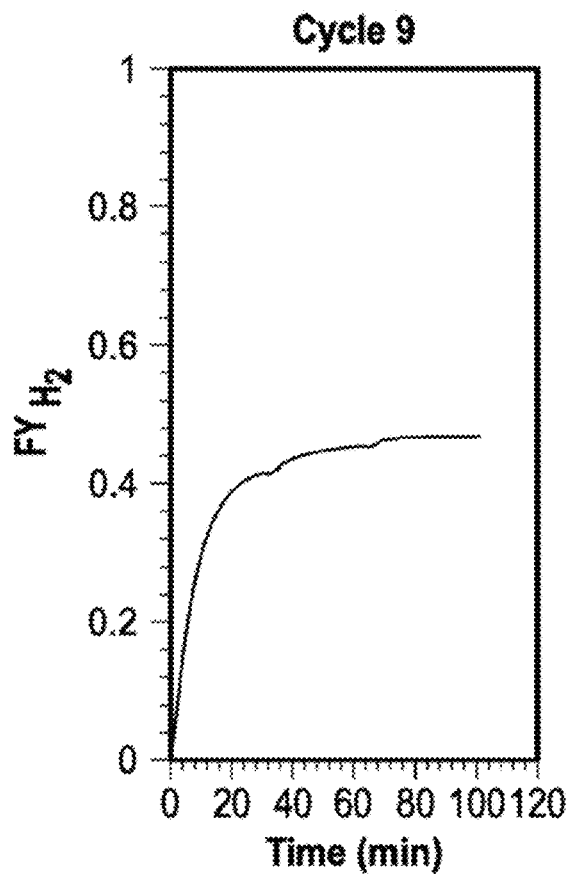
Figure 7B:
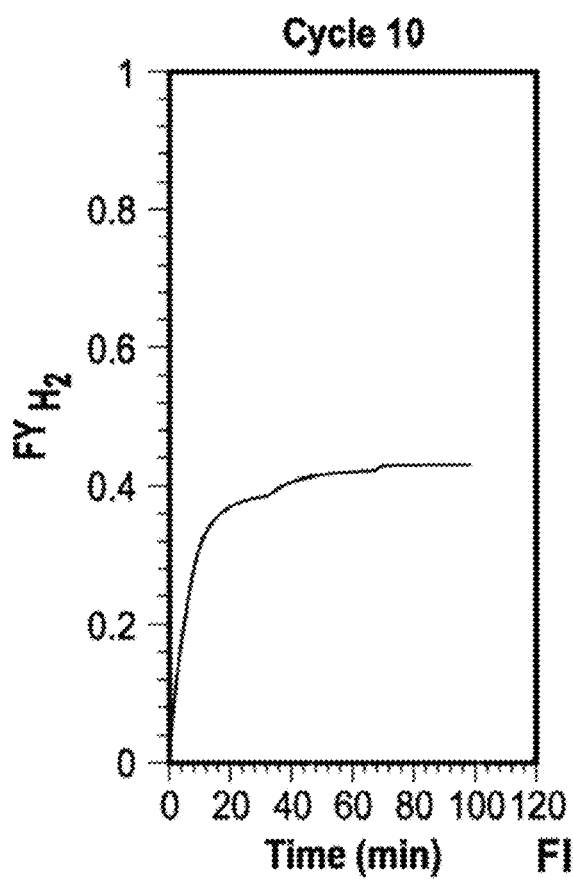
Figure 7B:
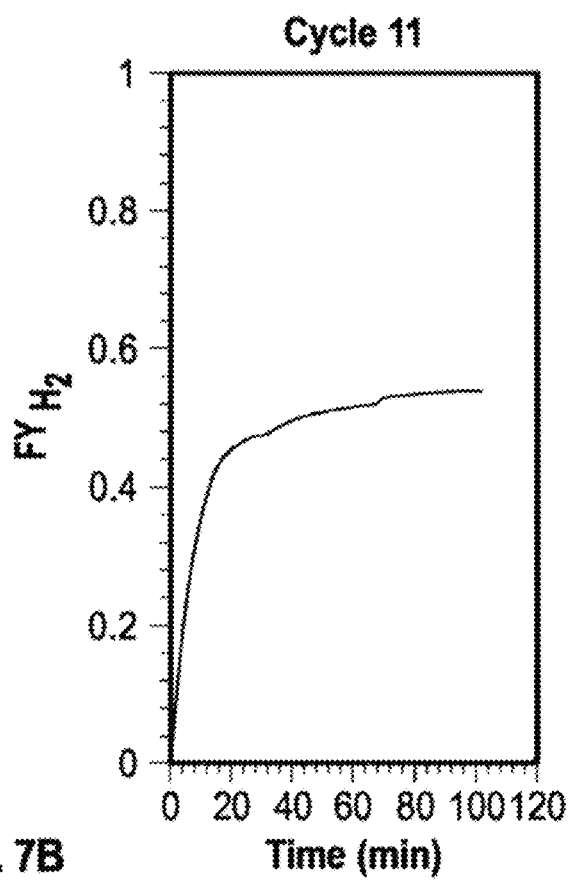

The fractional yield of hydrogen. $FY_{H2}$, is defined as the total volume of hydrogen produced from time 0 to t normalized by the maximum volume of the hydrogen production at STP, $\forall_{H_2,stoich}$, based on stoichiometric consumption of the initial mass of iron within the bed, $$FY_{H_2} = \frac{\int_0^t \dot{Q}_{H_2} dt}{\forall_{H_2 stoich}} \quad (4)$$

where $\dot{Q}_{H}$, is the hydrogen production rate in liters/minute at standard temperature and pressure (STP) and t is the time in minutes. FIGS. 7A and 7B shows the hydrogen fractional yield for several consecutive oxidation steps. FIG. 7A shows the hydrogen fractional yield for four consecutive oxidation/reduction cycles at 800° C. FIG. 7B shows the hydrogen fractional yield for the next four consecutive oxidation/reduction cycles at 800° C. The total hydrogen yield for different cycles ranges from 25 to 32 liters, depending on the available mass of the iron at the beginning of the oxidation reaction. The available mass of the iron depends on the total fractional yield of the preceding reduction step. In all the experiments, almost half of the total hydrogen production occurs during the first 10 minutes, and the subsequent hydrogen production rate decreases substantially.

Similar trends have been obtained at reaction temperatures of 600, 700 and 750° C.; but they are not shown here for brevity. At the lower temperatures, the fractional yield after 90 minutes is smaller due to reduced reaction rates. The reactivity of a sample (0.1 gram) of the magnetically stabilized porous structure has also been analyzed using a Thermogravimeter Analyzer (TGA), and the results reveal that the fractional yield (FY) is stable for more than 50 oxidation and reduction cycles.

During the reduction step, pure carbon monoxide enters the reactor and a mixture of carbon monoxide and carbon dioxide is discharged. A mass spectrometer is used to determine the fraction of the total discharge flow rate that is comprised of carbon dioxide. A period of 5 hours is chosen for the reduction reaction. The carbon dioxide fractional yield, $FY_{CO2}$, is defined as the total volume of carbon dioxide produced for the reduction period normalized by the maximum volume of carbon dioxide production based on complete stoichiometric conversion of magnetite to iron within the bed, $\forall_{CO_2,stoich}$. An equation similar to Equation (4) based on the $CO_2$ production rate is used to compute the carbon dioxide fractional yield during the reduction step for eight consecutive oxidation/reduction cycles at 800° C., and the results are shown in FIG. 8.

Figure 8:
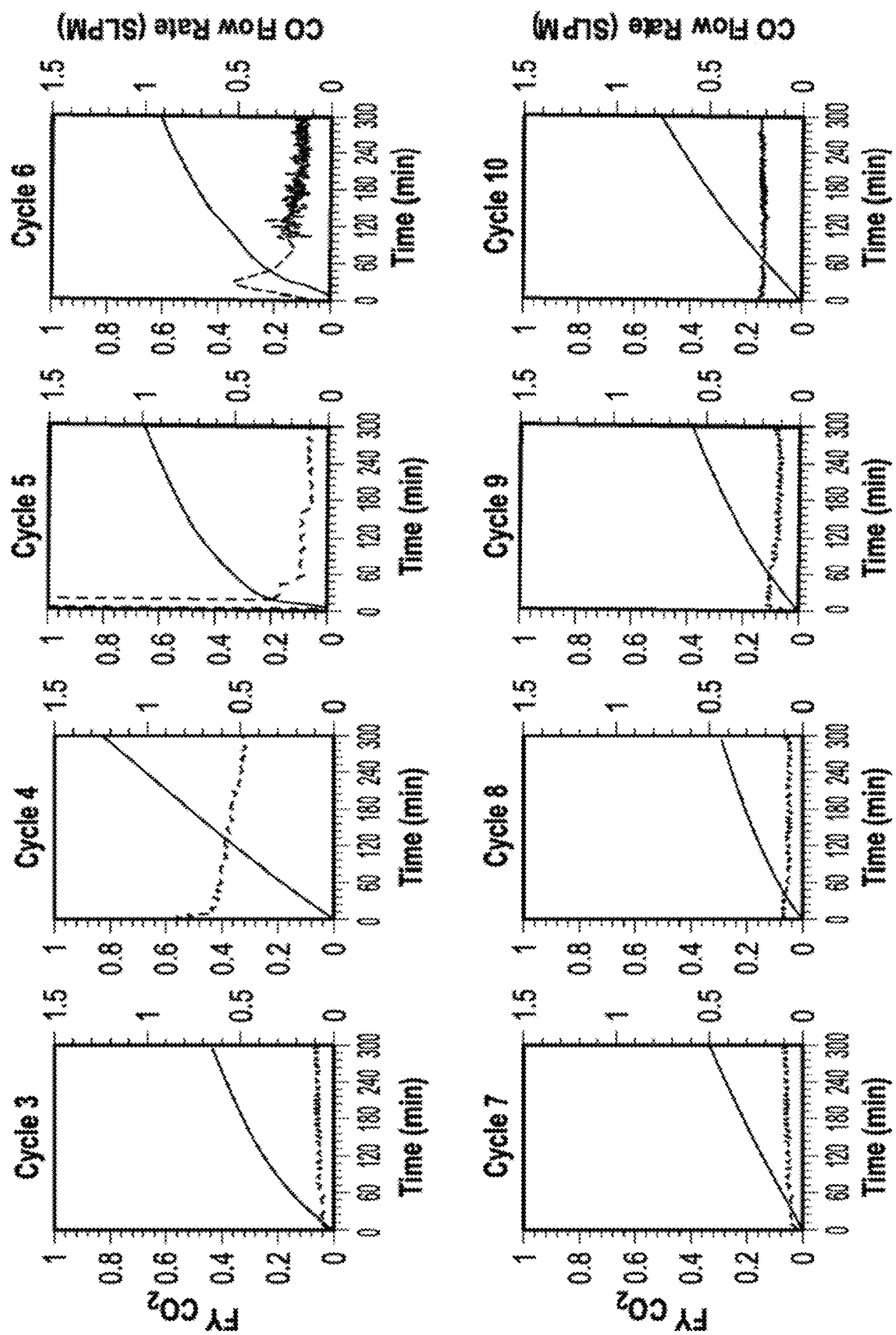
FIG. 8 shows the carbon dioxide fractional yield for eight consecutive oxidation/reduction cycles at 800° C. (solid lines are $FY_{CO2}$ and dotted lines are injected CO flow rates)

In the FIG. 8, the cycle numbers are labeled such that oxidation is the second step in the cycle. The total carbon dioxide yields during the reduction steps range from 14.5 to 43 liters. Therefore, during the 5 hours of reduction at 800° C., between 35 to 80% of the magnetite is reduced to elemental iron, depending on the injection rate of the reducing agent, carbon monoxide, into the reactor. In all experiments, the carbon monoxide flow rate is maintained above that required for stoichiometric consumption; however, FIG. 8 clearly shows that the reaction rate for the reduction step is highly dependent on the concentration of the carbon monoxide flowing into the reactor. The more carbon monoxide flow rate that passes through the bed, the faster the reduction is achieved. This trend can be clearly seen in cycle 4 and the first 10 minutes of cycle 3 in which the carbon monoxide injection rates are high. In both of these cases the carbon dioxide production rate (the slopes of the graphs) are significantly larger than the rest of the cycles. Note that introducing too much excess carbon monoxide might result in either coking or formation of iron carbide.

To ascertain the accuracy of the measurements, a mass balance between the hydrogen and carbon dioxide production is considered. It is desirable (from calculations not shown here) that the number of moles of hydrogen and carbon dioxide produced in each cycle should be equal; thus the total volumetric production of each should be the same. A comparison can be made by comparing the summation total volumetric production of hydrogen and carbon dioxide for many consecutive cycles. An examination reveals that the difference between the summation of the total hydrogen and carbon dioxide yields for 8 consecutive oxidation and reduction cycles is within 6% (a total of 235 liters of hydrogen versus 221 liters of carbon dioxide produced during 8 cycles).

In order to determine the performance of the disclosed reactor, it was compared to the performance of magnetically stabilized bed reactors with other reactor configurations reported in the open literature. Hui et al. investigated the oxidation and reduction of four bimetal modified iron oxide samples and showed that the $Fe_2O_3$—Mo—Al sample provides the fastest hydrogen production rate. Utilizing a very small amount of the packed sample (0.15 g) Hui el at, showed that the peak hydrogen production rate is about 5.6 $cc/g_{Fe}\cdot min$ at a reaction temperature of 460° C. for unmodified iron. The peak hydrogen production was about 18 $cc/g_{Fe}\cdot min$ in the first 2 cycles and drops to about 5.7 $cc/g_{Fe}\cdot min$ by the 4$^{th}$ cycle for an unmodified $Fe_2O_3$ sample at a reaction temperature of 550° C. Their most stable sample, $Fe_2O_3$—Mo—Al, showed peak rates of 14 $cc/g_{Fe}\cdot min$ at reaction a temperature of 300° C. without any noticeable degradation in the production rate over 4 consecutive cycles.

Kodama et al. recently conducted a series of experiments to analyze the reactivity of nickel-ferrite and cerium materials used for a two-step thermochemical water splitting cycle. For the thermal reduction step, metal oxide is thermally reduced for 60 minutes to release oxygen molecules in an inert gas at atmospheric pressure and at temperatures exceeding 1400° C. For the water splitting, oxidation step the thermally-reduced metal oxide reacts with steam for 30 minutes at 1000° C. to produce hydrogen. They showed that the total hydrogen production is the greatest for the $NiFe_2O_4/m$-$ZrO_2$ material, although the peak production rate is the greatest for $CeO_2$. The peak hydrogen production rate for $CeO_2$ during the first cycle was about 3.2 cc/($g_{material}\cdot min$) and the total hydrogen production yield remained almost unchanged during the first 5 cycles.

Otsuka et al examined 26 metal elements as additives to 0.2 g of iron sample and found that the decomposition of water was most stable for the reduced iron oxide with a Mo additive. The peak hydrogen production rate measured for pure iron was 8.98 $cc/g_{Fe}\cdot min$ and 15.28 $cc/g_{Fe}\cdot min$ with the MO additive. The BET analysis shows that the surface area of Fe-oxide (reduction at 843° K., oxidation at 573° K.) decreases from 19.9 to 2.0 $m^2\ g^{-1}$ after three redox cycles. Fe-oxide (Mo, 3 mol %) preserved a high surface area of 14.9 $m^2\ g^{-1}$ after three cycles.

Figure 9:
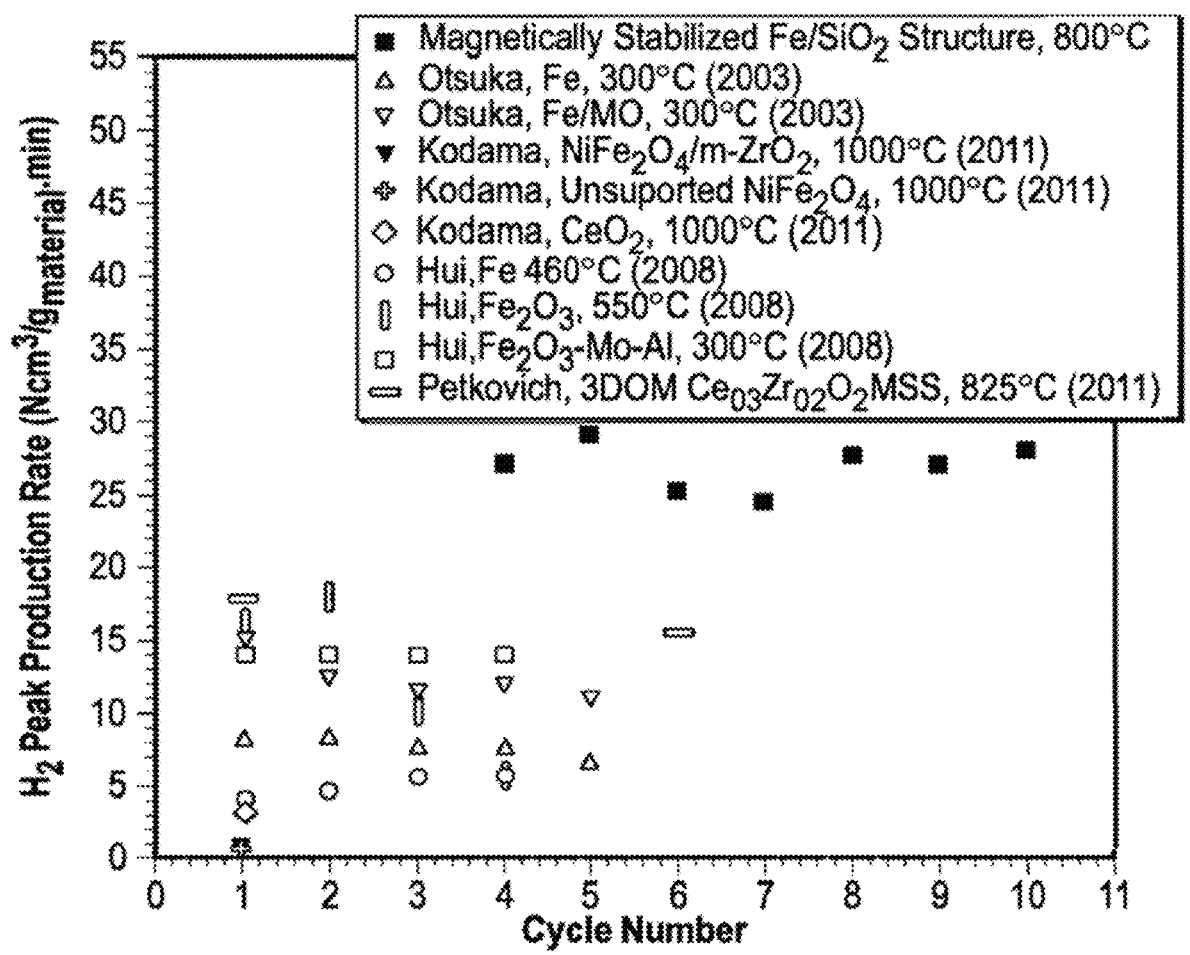
FIG. 9 is a graph showing comparisons of peak hydrogen production rates for repeated redox cycles using different reactive materials.

Recently, Petkovich et al. used three-dimensionally ordered macroporous (3DOM) $Ce_{1-x}Zr_xO_2$ materials to enhance the kinetics and overall production of $H_2$ through a two-step water splitting process. These microstructures enjoy a large chemically active surface area which is favorable for heterogeneous reactions. They have reported that a 3DOM $Ce_{1-x}Zr_xO_2$ structure significantly increases kinetics during water splitting compared to sintered, micrometer-sized $CeO_2$ particles. A fixed bed structure is used for their experiments at 825° C. Their structures were reduced using hydrogen and oxidized using steam. The maximum hydrogen production rates were reported for different samples including 3DOM $CeO_2$-PM, 3DOM $CeO_2$-MSS, 3DOM $Ce_{0.8}Zr_{0.2}$-PM, 3DOM $Ce_{0.8}Zr_{0.2}O_2$-MSS, 3DOM $Ce_{0.5}Zr_{0.5}O_2$-PM, $3DOM_{0.5}Ce_{0.5}Zr_{0.5}O_2$-MSS-IH, and 3DOM $Ce_{0.5}Zr_{0.5}O_2$-MSS. The highest observed reaction rate is for the 3DOM $Ce_{0.5}Zr_{0.5}O_2$-MSS sample. For this sample a rate of approximately 18 $cc/g_{material}\cdot min$ (800 $\mu mol\cdot min^{-1}\cdot g^{-1}$) was observed for the first oxidation cycle, and the rate dropped to 15 $cc/g_{material}\cdot min$ in cycle 6, FIG. 9 compares the peak hydrogen production rates with different materials and structures reported in the literature. As described earlier, the operational temperatures of some of the materials and structures reported in FIG. 9 were limited to low temperatures due to the sintering problem. Thus, a careful interpretation of the results is desirable. It is observed that the peak hydrogen production rate for the magnetically stabilized structure is significantly higher than those previously reported. More importantly, the magnetically stabilized structure is very stable upon successive cycling at temperatures as high as 800° C. Thus the magnetically stabilized structure is highly desirable for hydrogen production using a two-step looping process. Due to the high reactivity achieved with this structure, it may have broad applicability for a variety of chemical reactions.

In this example, the process of synthesizing a highly reactive magnetically stabilized porous structure is introduced, and the reactivity and stability of this structure is investigated for hydrogen production using a two-step iron based looping process. The results reveal that this porous structure has excellent reactivity and stability over 11 redox cycles. The peak hydrogen production rate for this structure is significantly higher than the best rate yet reported in the open literature. The high reactivity and stability of the magnetically stabilized porous structure makes it well suited for chemical processing applications.

Example 2

This example was conducted to demonstrate the manufacturing of the monolithic solid using activated carbon instead of silica. The activated carbon (second particle) is mixed into ferrite powder (first particle) and oxidized using either air or steam. In this manner, the activated carbon is converted from a solid to a gas, i.e., from carbon to carbon dioxide. Since the activated carbon is all converted to carbon dioxide during the oxidation, the resulting porous solid contains only the oxidized ferrite powder.

To test this approach, a 0.1 g sample of the activated carbon was tested in a thermogravimeter and oxidized using a flow of 10 cubic centimeters of air during a temperature ramp to 1000° C. at 5° C./min. The results of this test are seen in the FIG. 10.

Figure 10:
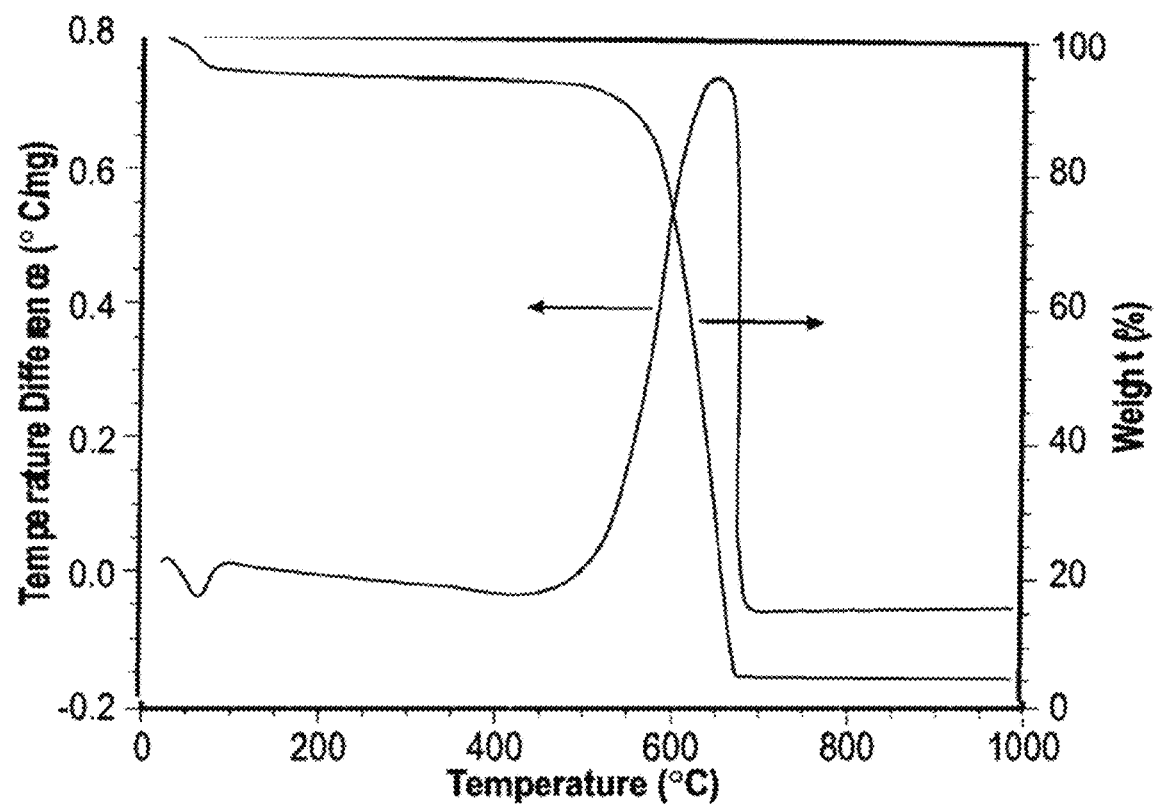
FIG. 10 is a graph showing thermogravimetric analysis (TGA) results for the oxidation of activated carbon during a temperature ramp to 1000° C. at 5° C./min.

It can be seen above that the onset of oxidation occurs at approximately 500° C. and rapid mass loss proceeds. While the FIG. 10 shows that 5% mass remains at the end of the cycle, this is in error due to instabilities occurring at the beginning of the cycle. This is why there is also a 5% decrease in weight at the beginning of the test. This is validated by the fact that at the end of the test, there was no material left in the crucible.

Figure 11:
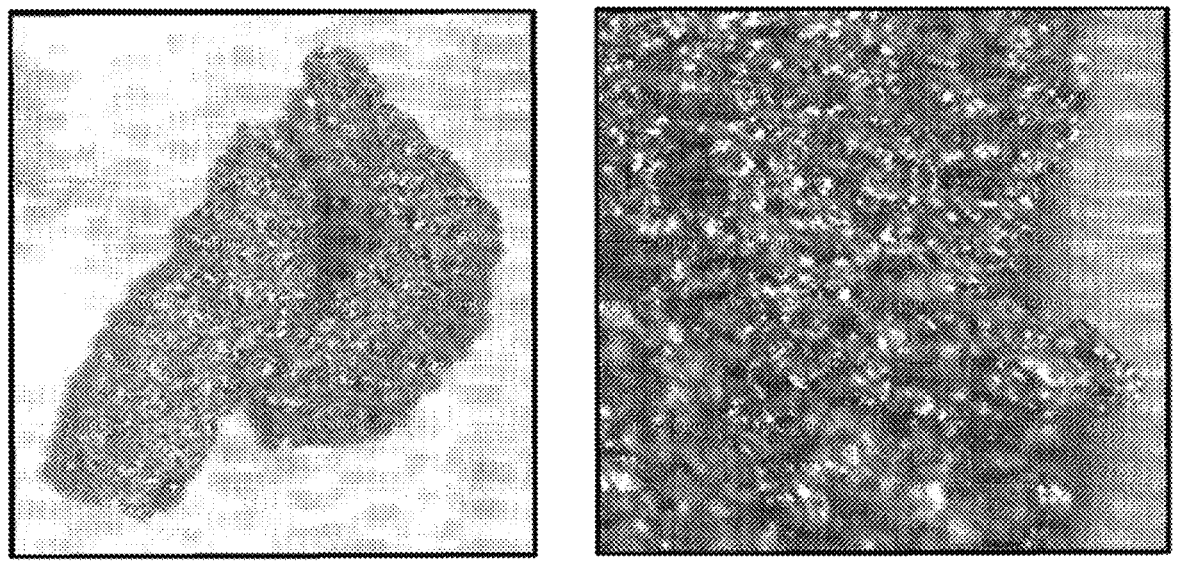
FIG. 11 shows photomicrographs (at two different magnifications) of the monolithic solid after the activation of carbon is completed.

The procedure for making a porous structure (i.e., the monolithic solid) is as follows. Ferrite powder (crushed and sieved to 75 to 125 micrometer size) and activated carbon (as received. Fisher Chemical, catalog number C272500) are mixed thoroughly together and placed into a quartz tube reactor. The mixture is then slowly heated (10° C./min) using an inert gas (Nitrogen/Argon) to 1000° C. The mixture is then reduced using a reducing gas (5% H in Ar) to bring the ferrite powder to its lowest oxidation state. This procedure has no effect on the activated carbon (already fully reduced). Following this, the powders are then oxidized using steam at low flow rates at the same temperature as reduction (1000-1200° C.). This allows for the oxidation of both the ferrite powder (Fe to $Fe_3O_4$, Co to $Co_3O_4$) and the activated carbon (C to $CO_2$). However, since the activated carbon becomes a gas and the ferrite powder sinters, the resulting structure after oxidation is a porous monolithic solid in a ferrite matrix. The voids exist where the activated carbon once had been. Images of a resulting ACOS structure are shown below in FIG. 11. The resulting porous sintered structure remains stable after repeated oxidation and reduction cycles at temperatures up to 1500° C. Thus, this structure is very useful for a cyclical looping process that requires thermal reduction at temperatures up to 1400° C. Such a looping process can be used to produce syngas by splitting water and carbon dioxide using concentrated solar radiation in conjunction with the porous metal ferrite structure.

From this example, it may be seen that the second particle may be consumed or converted during the formation of the monolithic solid. Thus the monolithic solid may comprise a plurality of first particles that are bonded together. In one embodiment, the second particles can be consumed after the formation of the monolithic solid, leaving behind a porous monolithic solid that comprises only a plurality of first particles.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this disclosure.

The invention claimed is:

1. A monolithic solid comprising:
a plurality of second particles and a plurality of electrically aligned chains or magnetically aligned chains comprising a plurality of fused first metal particles, wherein the plurality of second particles is present between the electrically aligned chains or magnetically aligned chains,
wherein first metal particles are magnetic particles and the second particles are not magnetic particles;
wherein the first metal particles comprise an alloy magnet, wherein the alloy magnet does not include a rare earth metal;
wherein the first metal particles have an average particle size of about 40 micrometers to about 100 micrometers;
wherein the second particles have an average particle size of about 20 micrometers to about 100 micrometers.

2. The monolithic solid of claim 1, wherein the first metal particles comprise iron, cobalt, nickel or a combination comprising at least one of iron, cobalt or nickel.

3. The monolithic solid of claim 1, wherein the alloy magnet comprises $FeOFe_2O_3$, $NiOFe_2O_3$, $CuOFe_2O_3$, $MgOFe_2O_3$, MnBi, MnSb, $MnOFe_2O$, or an alloy comprising the elements aluminum, iron, cobalt and nickel.

4. The monolithic solid of claim 1, wherein the second particle comprises an inorganic oxide, an inorganic carbide, an inorganic oxycarbide, an inorganic nitride, an inorganic oxynitride, a polymer or a combination thereof.

5. The monolithic solid of claim 1, wherein the second particle is an inorganic oxide and is selected from the group consisting of silica, alumina, zirconia, titania, ceria, iron oxide, and a combination comprising at least one of the foregoing inorganic oxides.

6. The monolithic solid of claim 1, wherein the second particle comprises silica or activated carbon.

7. The monolithic solid of claim 1, wherein the second particle has bulk volume resistivity that is greater than about $1 \times 10^{11}$ ohm-cm.

8. The monolithic solid of claim 1, wherein the first metal particles have an average particle size of about 75 micrometers to about 90 micrometers.

9. The monolithic solid of claim 1, wherein the second particles have an average particle size of about 50 micrometers to about 75 micrometers.

10. The monolithic solid of claim 1, wherein the monolithic solid is produced from a mixture of first particles and second particles, wherein the first metal particles are from about 10 wt % to about 90 wt % of the mixture, and the second metal particles are from about 10 wt % to about 90 wt % of the mixture.

11. The monolithic solid of claim 10, wherein the first metal particles are from about 20 wt % to about 50 wt % of the mixture.

12. The monolithic solid of claim 10, wherein the second particles are from about 50 wt % to about 80 wt % of the mixture.

13. The monolithic solid of claim 10, wherein the second particles comprise silica or activated carbon having an average particle size of about 50 micrometers to about 75 micrometers, wherein the second particles are from about 50 wt % to about 80 wt % of the mixture.

14. The monolithic solid of claim 10, wherein the second particles comprise silica or activated carbon having an average particle size of about 40 micrometers to about 100 micrometers, wherein the first particles are from about 10 wt % to about 90 wt % of the mixture.

15. The monolithic solid of claim 10, wherein the second particles comprise silica or activated carbon having an average particle size of about 75 micrometers to about 90 micrometers, wherein the first particles are from about 20 wt % to about 50 wt % of the mixture.

16. An article comprising the monolithic solid of claim 1.

\* \* \* \* \*